US012640055B2

(12) United States Patent
Nowosielski et al.

(10) Patent No.: US 12,640,055 B2
(45) Date of Patent: May 26, 2026

(54) SYSTEM FOR A MINIMALLY INVASIVE SURGERY TRAINING

(71) Applicant: Laparo Sp. Z o.o., Wrocław (PL)

(72) Inventors: Radosław Nowosielski, Opole (PL); Mateusz Rulewicz, Wrocław (PL); Martyna Strauchmann, Wolsztyn (PL); Melania Hofman, Wrocław (PL); Piotr Daroch, Wrocław (PL)

(73) Assignee: Laparo Sp. Z o.o., Wroclaw (PL)

( * ) Notice: Subject to any disclaimer, the term of this patent is extended or adjusted under 35 U.S.C. 154(b) by 312 days.

(21) Appl. No.: 18/261,131

(22) PCT Filed: Feb. 4, 2022

(86) PCT No.: PCT/IB2022/050989
§ 371 (c)(1),
(2) Date: Jul. 12, 2023

(87) PCT Pub. No.: WO2022/167993
PCT Pub. Date: Aug. 11, 2022

(65) Prior Publication Data
US 2024/0071255 A1    Feb. 29, 2024

(30) Foreign Application Priority Data
Feb. 8, 2021    (PL) ..................................... P.436896

(51) Int. Cl.
*G09B 23/28*    (2006.01)
*G09B 23/32*    (2006.01)

(52) U.S. Cl.
CPC .......... *G09B 23/285* (2013.01); *G09B 23/32* (2013.01)

(58) Field of Classification Search
CPC .............................. G09B 23/285; G09B 23/32
See application file for complete search history.

(56) References Cited

U.S. PATENT DOCUMENTS 6,377,011 B1 *  4/2002  Ben-Ur ................... G06F 3/016
                                                           345/184
7,300,240 B2   11/2007  Brogårdh
(Continued)

OTHER PUBLICATIONS

European Patent Office, International Search Report, Application No. PCT/IB2022/050989, Jun. 21, 2022, 5 pages.
(Continued)

*Primary Examiner* — Robert P Bullington, Esq.
(74) *Attorney, Agent, or Firm* — Ziegler IP Law Group, LLC.

(57)    ABSTRACT

The invention provides a system for training of a minimally invasive surgery. It is the aim of the invention to provide a system for training of a minimally invasive surgery which would enable positioning objects in different places of the workspace. Moreover, it is the aim of the invention to provide a system in which an object may be set at different angles. The system for training of a minimally invasive surgery, comprising a housing (1), at least one minimally invasive surgery tool (2) and a workspace (3), is characterized in that it comprises at least one movable mechanism with at least two actuators, and the workspace (3) is connected to the movable mechanism which movable mechanism is connected to the housing (1).

14 Claims, 6 Drawing Sheets

(56)                    References Cited

U.S. PATENT DOCUMENTS

Figure 1:
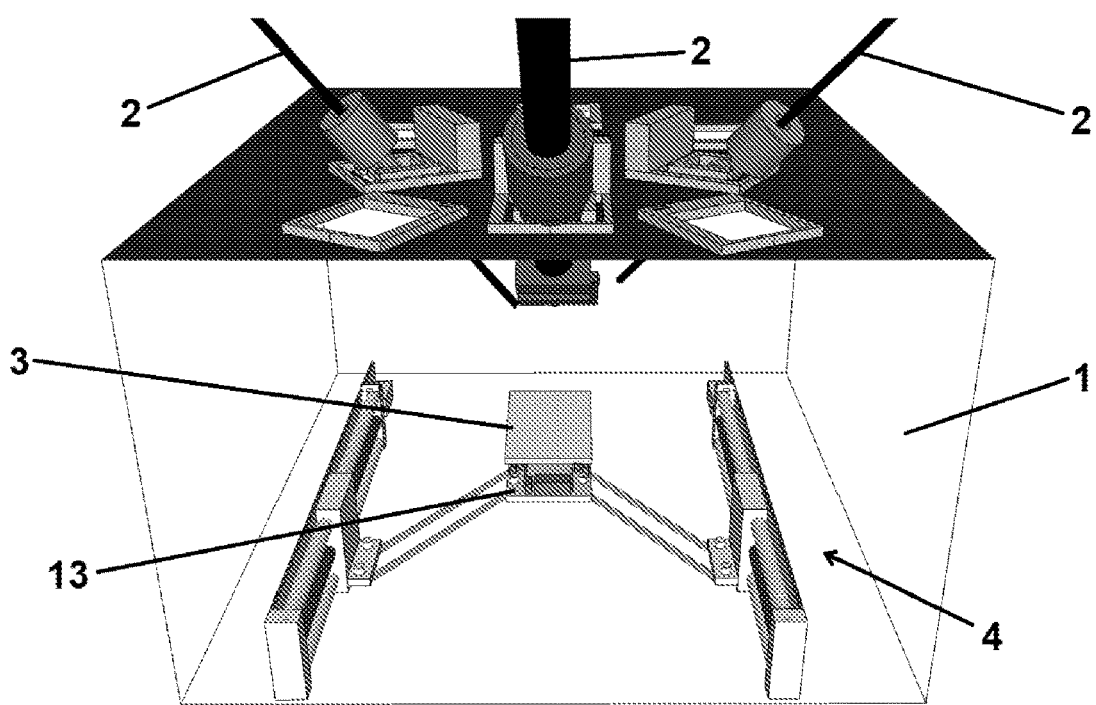

2009/0263775  A1      10/2009   Ullrich
2010/0234857  A1*      9/2010   Itkowitz ............... G09B 23/285
                                                    700/259

OTHER PUBLICATIONS

Timothy R Coles et al: "Integrating Haptics with Augmented Reality in a Femoral Palpation and Needle Insertion Training Simulation", IEEE Transactions on Haptics, IEEE, USA, vol. 4, np.3 May 1, 2011, pp. 199-209, XP011371059, ISSN: 1939-1412, DOI: 10.1109/TOH.2011.32, 11 pages.
Wikipedia: "Linear actuator", Dec. 30, 2020, XP055913302, Retrieved from the Internet: URL: https://en.wikipedia.org/w/index.php?title= Linear_actuator&oldid=997241692, retrieved on Apr. 19, 2022, p. 3-p. 4.

* cited by examiner

SYSTEM FOR A MINIMALLY INVASIVE SURGERY TRAINING

The invention provides a system for minimally invasive surgery training.

A minimally invasive surgery training may be carried out, according to the solutions of the prior art, in two different environments: on physical objects or under virtual reality conditions. Each of the mentioned concepts has its advantages and disad-vantages. The invention provides a complete solution that makes it possible to combine the two mentioned environments. This idea enables complete learning of the surgeon skills under the most suitable conditions. This hybrid solution maximizes advantages of the two solutions and eliminates shortcomings thereof. Physical trainer simulator is necessary to develop proficiency in manual skills. For example, sewing skill learning should be performed on real training objects. Virtual reality in turn helps in surgical procedures. Simulated environment very closely reflects the operation anatomy and teaches the user to use proper surgery operational technique step by step for each procedure type. Additionally, under the conditions of virtual reality the user may learn electrosurgery under safe conditions.

Document CN 2751372 Y discloses a training table with a laparoscope simulation, including a container for a casting of an abdomen, a camera and a monitor. The casting chamber of the abdominal cavity simulates an artificial condition of abdominal pneumatosis in a laparoscopic procedure. The camera is positioned within the container for the abdomen and is connected to the monitor. The surface of the box is provided with connecting openings wherein laparoscope operational instruments are placed. Simulated portions of the human body are positioned within the container.

Document CN 203038553 U discloses a training device for laparoscope simulation. The training device effectively integrates a body surface panel, a supporting panel, an operation platform, a base plate and a side panel by means of hinges, and it is capable of simulating the piercing channel in the human body surface and in a cavity in a human body. Simulation instruments may be introduced into the training device in order to carry out trainings in stitching technology, ligation and separation, that are used for the purpose of simulation of a surgery procedure area.

Document PL 424841 A1 discloses a handling/measuring member of a laparoscope training device that enables manual and virtual laparoscope training. The manipulating and measuring element is a working tool and a trocar. A grip accommodates a sensor of opening of the operational tip jaw. From below the grip, in a sleeve axis, a flat light reflecting reflector is centrally secured. A trocar has a funnel-shaped body closed by a cover at the top, and within it there i san axially positioned guiding channel for an operational tool as well as sensors to determine desired parameters that characterize the action of the operational tool.

The invention provides a system for a minimally invasive surgery training, comprising a housing, at least one minimally invasive surgery tool and a workspace. The system is characterized in that it further comprises at least one movable mechanism with at least two actuators. The workspace is connected to the movable mechanism which movable mechanism is connected to the housing.

Preferably, the actuator is an electric motor.

Preferably, the movable mechanism comprises a transmission of the electric motor.

Preferably, the movable mechanism comprises at least one encoder.

Preferably, it comprises a control arrangement and preferably, the control arrangement comprises a controller and an electric motor controller.

Preferably, it comprises at least two terminal switches.

Preferably, the operational mechanism is a guide that comprises two screws, each preferably connected to the axis of the electric motor. Each of the screws is connected to a different carriage of the guide. One of the carriages of the guide is connected with at least one guiding arm to the carriage, and the other guide carriage is connected with at least two guiding arms to the carriage, and preferably the carriage is the workspace.

Preferably, the operational mechanism is a guide comprising a first linear guide to which a guide carriage is mounted movably. To the guide carriage a second linear guide is mounted. The first linear guide is rotated by 90 degrees with regard to the second linear guide. The guide carriage comprises a first pulley, a second pulley, a third pulley, and a fourth pulley. To the second linear guide a carriage is mounted. At the first end of the second linear guide there is a belt fastening means, and at the other end of the second linear guide a fifth pulley and a sixth pulley are arranged. On the extension of the first linear guide, at the first end, a first drive pulley is arranged, preferably connected to the axis of the electric motor, and on the extension of the first guide, at the other end, a second drive pulley is arranged, preferably connected to the axis of the electric motor. The belt is fastened to the belt fastening means and the belt spans between the first pulley, the first drive pulley, the third pulley, the fifth pulley, the sixth pulley, the fourth pulley, the second drive pulley, the second pulley, and the belt fastening means. Preferably, the carriage is the workspace.

Preferably, the movable mechanism is a carriage connected with at least one arm to the workspace. At least one arm is connected to the axis of the electric motor, and more preferably the carriage is connected to the guide.

Preferably, each of the first arms is connected to the carriage and the workspace, and more preferably each of the first arms is connected to the axis of the electric motor.

Preferably, a first electric motor is connected to the carriage 13. To the axis of the first electric motor, at the first end, at least one arm is connected. At least one arm, at the other end, is connected to the axis of a second electric motor 8 connected to the workspace.

Preferably, each of the second arms is connected to one of the third arms. Each second arm joins the carriage. Each third arm joins the workspace, and more preferably each second arm joins the axis of the electric motor.

Preferably, each of the fourth arms is connected to one of the fifths arms. Each fourth arm joins the carriage. Each fifth arm joins the workspace, and preferably each fourth arm joins the axis of the electric motor.

Preferably, the movable mechanism is a carriage. Each of the first arms is connected to the carriage, preferably the first arms are connected to the axis of the electric motor. Each of the second arms is connected to the workspace and each of the second arms is connected with a different first arm. Each of the third arms is connected to the carriage, preferably the third arms are connected to the axis of the electric motor. Each of the fourth arms is connected at one end with a different fifth arm and at the other end with a different third arm. Each of the fifths arms is connected to the workspace. Each of the second arms is connected to a different fourth arm.

It is the aim of the invention to provide a system for training of a minimally invasive surgery, providing a possibility for positioning objects in different places of the training space. Furthermore, it is the aim of the invention to provide a system wherein an object may be set at different angles.

Figure 2:
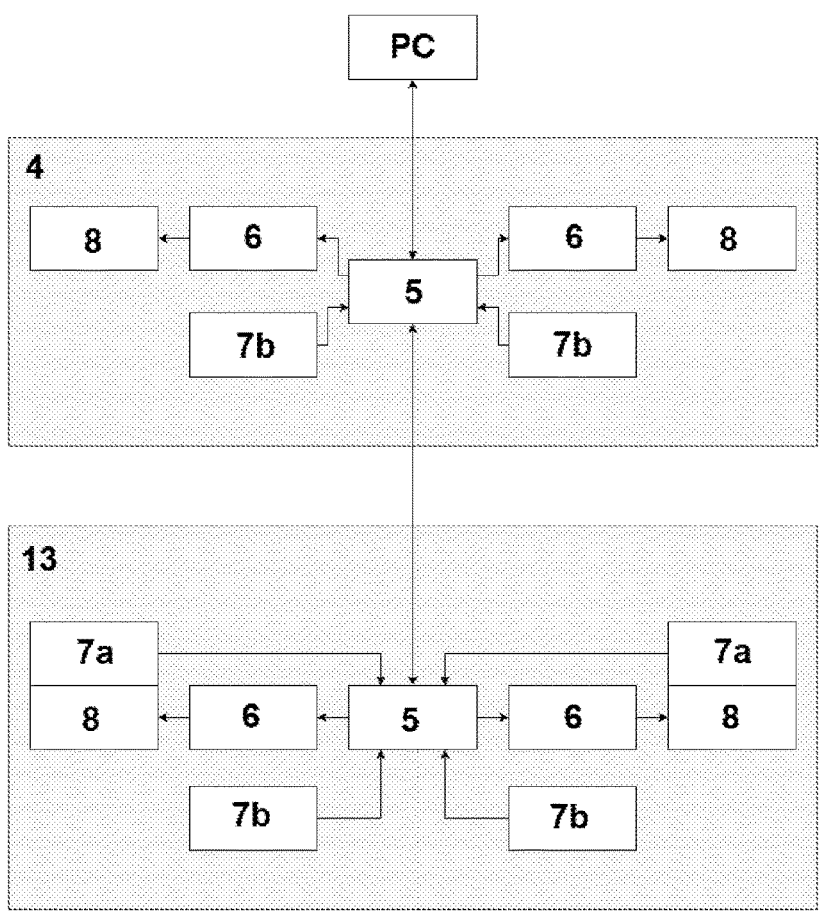
Figure 3:
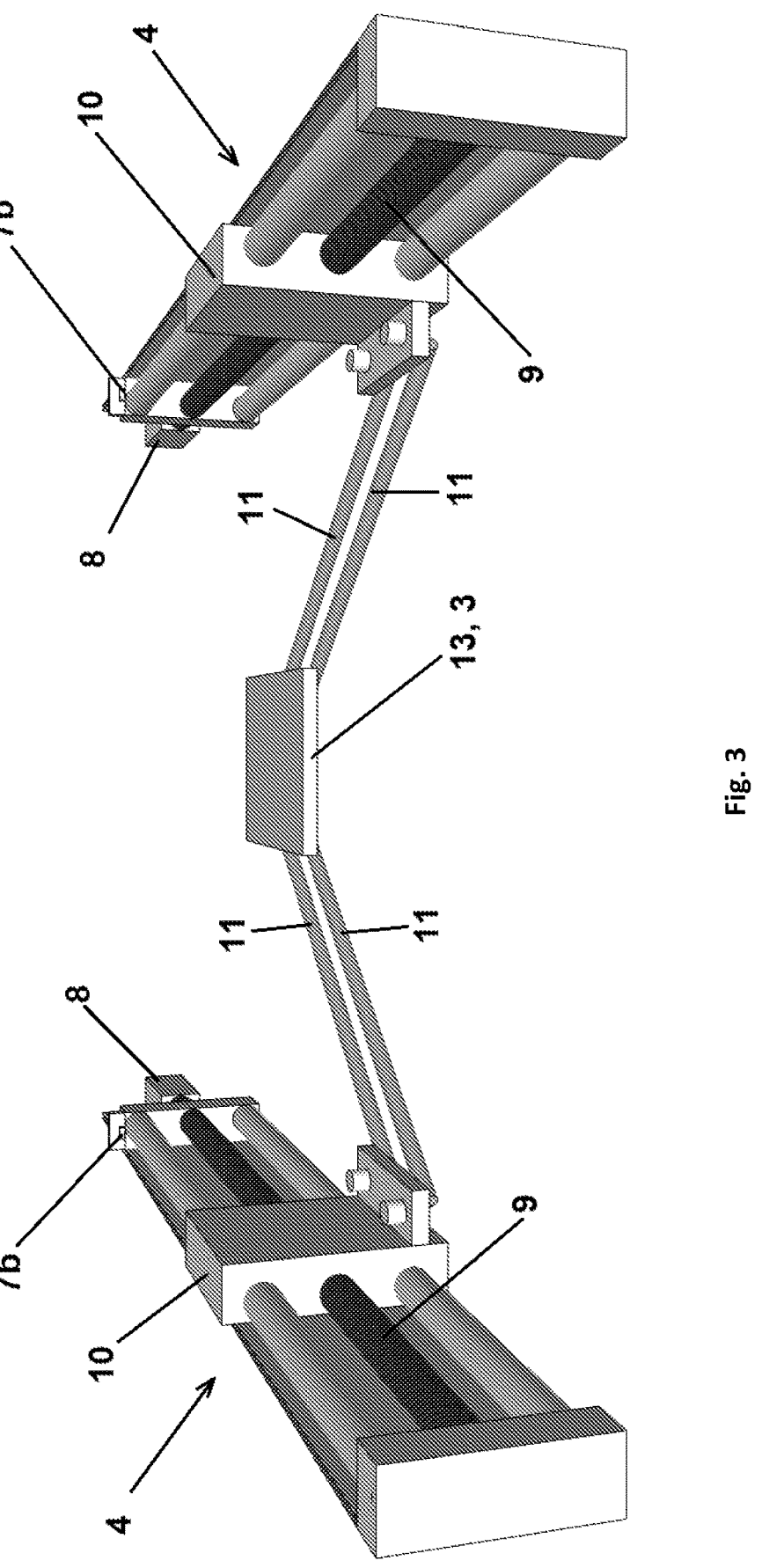
Figure 4:
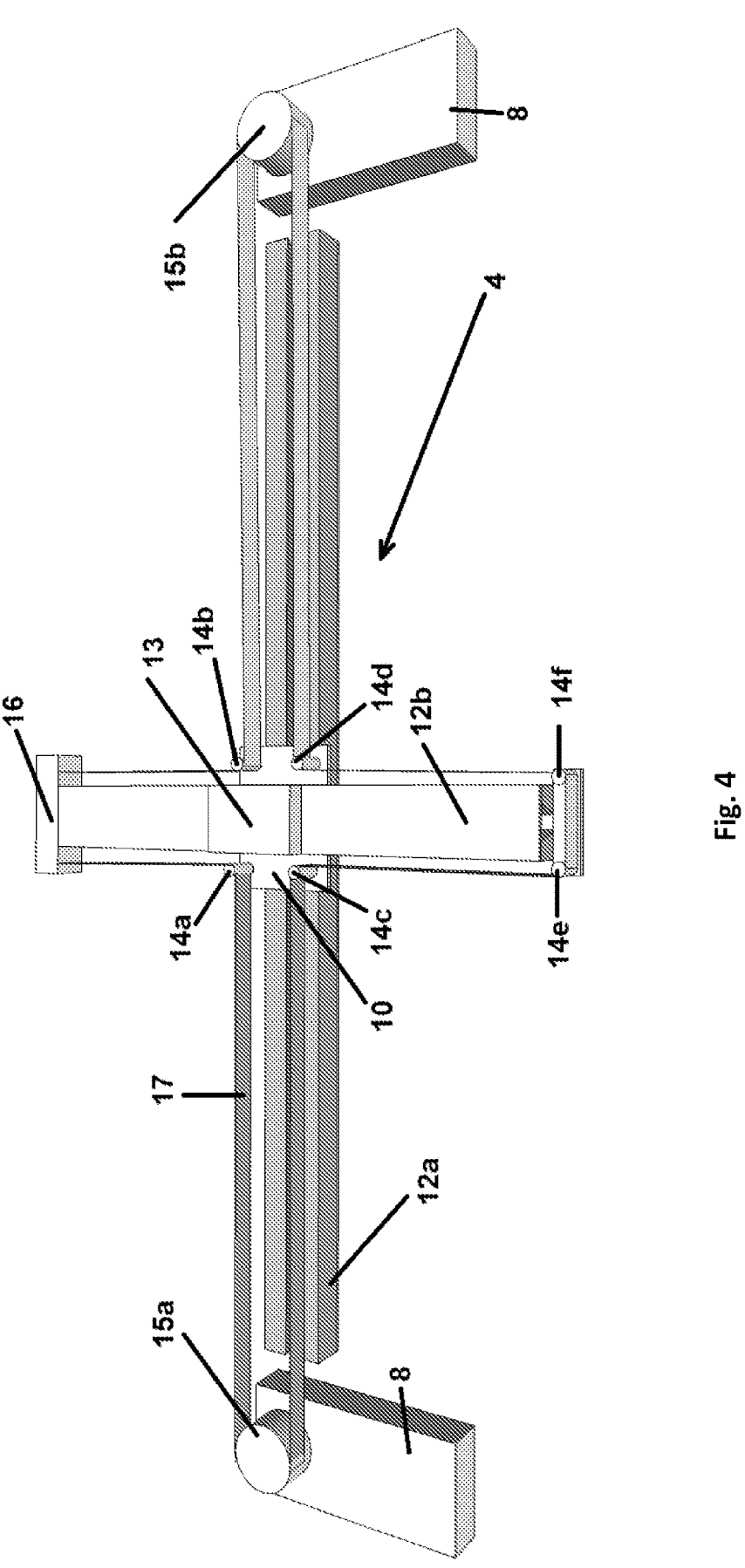
Figure 5:
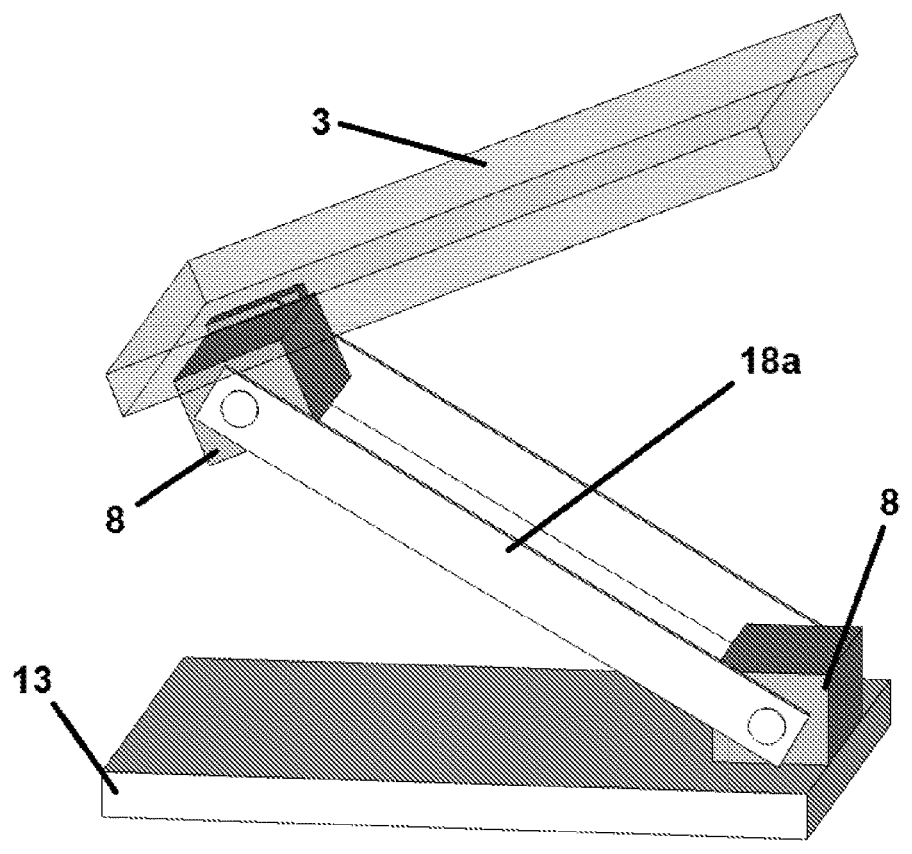
Figure 6:
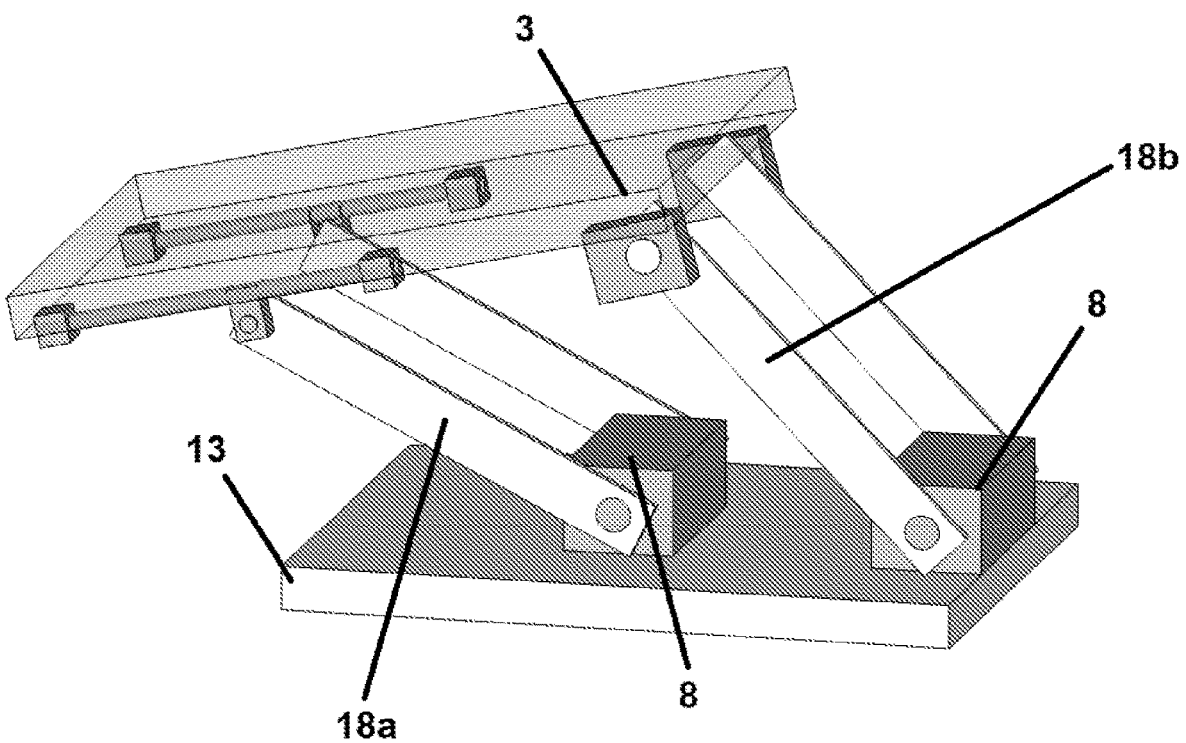

The invention will be described with reference to the drawing in which:

FIG. 1 shows a general view of a system for training of a minimally invasive surgery, FIG. 2 shows an exemplary diagram of interconnections of the elements of the system, FIG. 3 shows a first embodiments of a movable mechanism for positioning of the object within the x-y plane, FIG. 4 shows a second embodiments of a movable mechanism for positioning of the object within the x-y plane, FIG. 5-9 show embodiments of a movable mechanism for raising an tilting an object.

In FIG. 1 a system for the minimally invasive surgery training is shown along with its most relevant elements. The system for training of the minimally invasive surgery according to the invention comprises a housing 1, at least one minimally invasive surgery tool 2 and a workspace 3. The minimally invasive surgery tool 2 may be a camera, a manipulator, claws, scissors or any other tool (or its training equivalent), that may be applicable during minimally invasive surgery procedures (laparoscopy). The housing 1 defines a training space to simulate actions within the body of a patient. The workspace 3 is a place where the object used for training is positioned.

The system also comprises at least one movable mechanism with at least two actuators in a form of e.g. pneumatic actuators, hydraulic actuators or electric motors 8, preferably along with a transmission, but it should be noted that a person skilled in the art will be able to propose also other kinds of actuators. The movable mechanism enables positioning of the object for the purposes of the training—the most advantageous solution is provision of a capability of movement within the x-y plane, raising and lowering of the object and tilting of the object. Nevertheless, it should be pointed out that in some solutions only one or some of the mentioned capabilities of positioning of the object may suffice.

The workspace 3, in an embodiment, is connected to the movable mechanism, and it may constitute a part of the movable mechanism. The movable mechanism is furthermore connected to the housing 1.

In order to provide precise positioning of the workspace 3 it is possible to determine position by means of an encoder 7a—this may be for example an encoder 7a that calculates rotations of the electric motor 8 or a linear encoder 7a to determine the position of the workspace 3.

In a preferable embodiment, the system comprises a control arrangement to control the movable mechanism. It should be emphasized that an embodiment of the invention is contemplated in which control signals are provided to actuators of the movable mechanism from an external control arrangement. In a preferable embodiment, the control arrangement is a controller 5 which may be for example a microcontroller or a computer, and a controller 6 of the electric motor 8.

In another embodiment, the system comprises at least two terminal switches 7b to enable detection of the terminal position of the workspace 3.

FIG. 2 shows a preferable embodiment in which two movable mechanisms are provided—a guide 4 and a carriage 13. In this embodiment information concerning the position of the object are transmitted from the computer to the controller 5 of the guide 4, and next they reach the controller 5 of the carriage 13. It should be noted that signal might be transmitted directly from the computer to the two controllers 5. From each of the controllers 5 signal is transmitted further on to the controllers 6 of an electric motor 8 to control electric motors 8. The controllers 5 receive feedback from the terminal switches 7b. In this embodiment, the carriage 13 is also equipped with encoders 7a which transmit signal to the controller 5 of the carriage 13.

FIG. 3 shows an embodiment where the movable mechanism is a guide 4. The guide 4 comprises two screws 9, each screw being preferably connected to the axis of the electric motor 8. Each of the screws 9 is connected to a different carriage 10 of the guide. One of the carriages 10 of the guide is connected with at least one guiding arm 11 to the carriage 13, and the carriage 10 of the guide is connected with at least two guiding arms 11 to the carriage 13, the carriage 13 being preferably the workspace 3.

FIG. 4 shows a second embodiment of a guide 4. In this example, the guide 4 comprising a first linear guide 12a to which a carriage 10 of the guide is movably mounted. To the carriage 10 of the guide also a second linear guide 12b is movably mounted. The first linear guide 12a is rotated by an angle of 90 degrees with regard to the second linear guide 12b. The carriage 10 of the guide comprises a first pulley 14a, a second pulley 14b, a third pulley 14c, and a fourth pulley 14d. To the second linear guide 12b a carriage 13 is mounted. At the first end of the second linear guide 12b the belt fixing means 16 for the belt 17 is provided, and at the other end of the second linear guide 12b a fifth pulley 14e and a sixth pulley 14f are arranged. On the extension of the first linear guide 12a, at the first end, a first drive pulley 15a is arranged. On the extension of the first linear guide, at the other end, a second drive pulley 15b is arranged. In a preferable embodiment, at least one pulley, more preferably two pulleys, are connected to the axis of the electric motor 8. The belt 17 is fixed to the belt fixing means 16 for the belt 17 and the belt 16 spans between the first pulley 14a, the first drive pulley 15a, the third pulley 14c, the fifth pulley 14e, the sixth pulley 14f, the fourth pulley 14d, the second drive pulley 15b, the second drive pulley 14b and the belt fixing means 16 for the belt 17, and preferably the carriage 13 is the workspace 3.

The guides 4, as shown in FIGS. 3 and 4, enable movement of the workspace 3 in the x-y plane.

In another embodiment, the movable mechanism is a carriage 13 connected with at least one arm 18a to the workspace 3. At least one arm 18a is connected to the axis of the electric motor. In a preferable variant, the carriage 13 is connected to the guide 4. In another variant, each of the first arms 18a is connected to the axis of the electric motor 8. In [FIG. 5] an embodiment is shown where the first electric motor 8 is connected to the carriage 13, and to the axis of the first electric motor 8, at the first end, at least one arm 18a is connected, wherein at least one arm 18a, at the other end, is connected to the axis of the second electric motor 8 connected to the workspace 3. In a still other embodiment of a system with a carriage 13, each of the first arms 18a is connected to the carriage 13 and to the workspace 3. In a preferable embodiment, each of the first arms 18a is connected to the axis of the electric motor 8. This example is shown in [FIG. 6].

In a further embodiment of a system with a carriage 13, each of the second arms 18b is connected to one of the third arms 18c. Each second arm 18b joins the carriage 13, and each third arm 18c joins the workspace 3. In a preferable variant, each second arm 18*b* joins the axis of the electric motor 8. This example is shown in [FIG. 7].

In a further embodiment of a system with a carriage 13, each of the fourth arms 18*d* is connected to one of the fifth arms 18*e*. Each fourth arm 18*d* joins the carriage 13, and each fifth arm 18*e* joins the workspace 3. In a preferable embodiment, each fourth arm 18*d* joins the axis of the electric motor 8. This example is shown in [FIG. 8].

Figure 9:
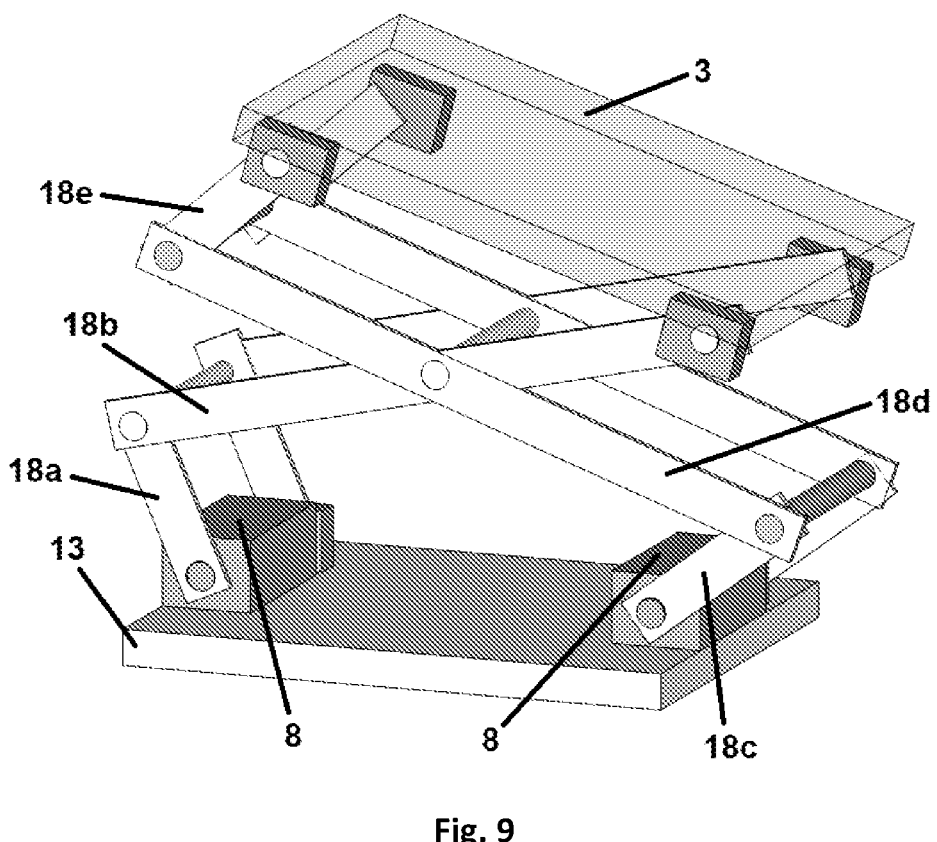

In a still further embodiment of a carriage 13, as shown in [FIG. 9], each of the first arms 18*a* is connected to the carriage 13, and preferably the first arms 18*a* are connected to the axis of the electric motor 8. Each of the second arms 18*b* is connected to the workspace 3 and each of the second arms 18*b* is connected to a different first arm 18*a*. Each of the third arms 18*c* is connected to the carriage 13, and preferably the third arms 18*c* are connected to the axis of the electric motor 8. Each of the fourth arms 18*d* is connected at one end with a different fifth arm 18*e*, and at the other end with a different third arm 18*c*. Each of the fifths arms 18*e* joins the workspace 3, and each of the second arms 18*b* joins a different fourth arm 18*d*.

Figure 7:
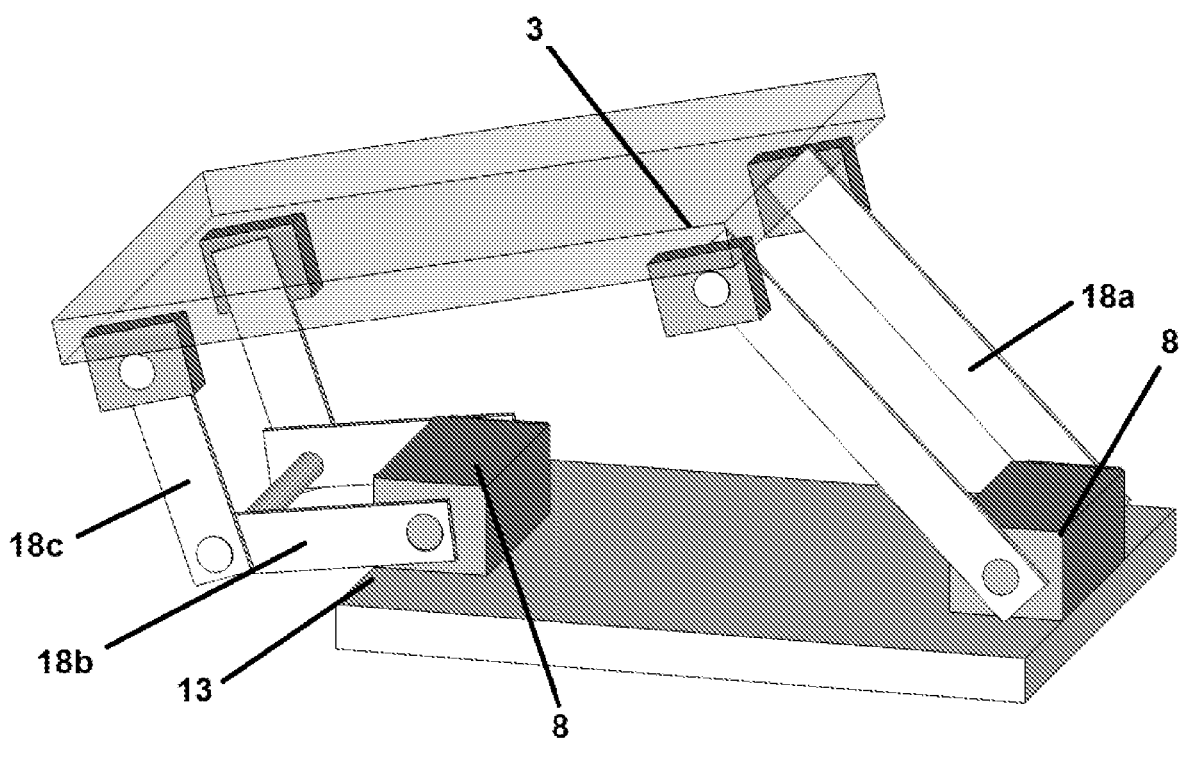
Figure 8:
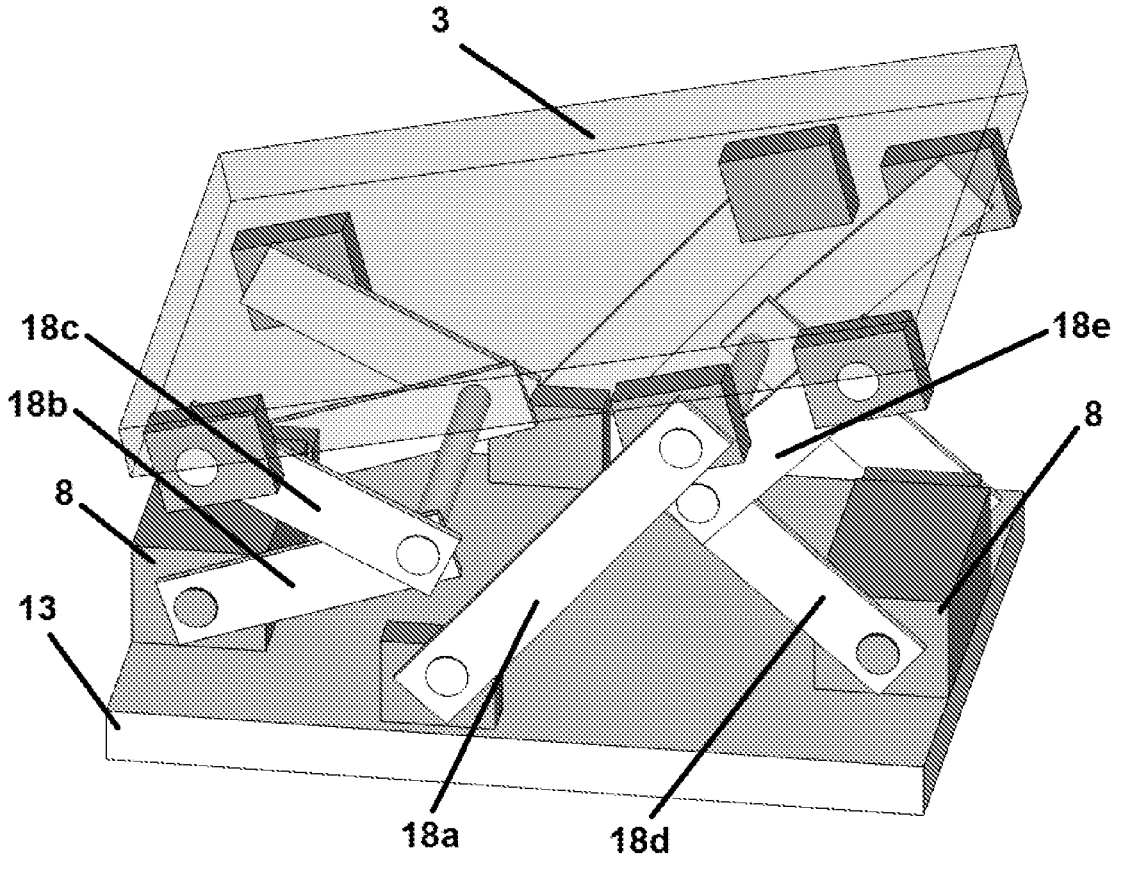

It should be noted that the term "connected" as used throughout the specification may refer both to a rigid immovable connection of elements and to a movable connection of elements—in particular within the context of arm connections. A person skilled in the art, with regard to the aim of the invention, will not have any doubts which elements are connected movably. It should be also emphasized that arm connections may be implemented through a common axis that links all the arms of the same type, as shown in FIGS. 7, 8, 9.

According to the invention, the system may have solely a guide 4 and a carriage 13 independently, or it may have a guide that moves a carriage 13 as well. For the convenience, the carriage 13 may be an element of a guide 4, or an intendent mechanism responsible for raising and tilting of the workspace as well. It should be noted that in the case where the workspace 3 moves solely within the x-y plane, in this variant the carriage 13 has the function of the workspace.

1 housing
2 minimally invasive surgery tool
3 workspace
4 guide
5 controller
6 electric motor controller
7*a* encoder
7*b* terminal switches
8 electric motor
9 screw
10 guide carriage
11 guiding arm
12*a* first linear guide
12*b* second linear guide
13 carriage
14*a* first pulley
14*b* second pulley
14*c* third pulley
14*d* fourth pulley
14*e* fifth pulley
14*f* sixth pulley
15*a* first drive pulley
15*b* second drive pulley
16 belt fixing means
17 belt
18*a* first arm
18*b* second arm

18*c* third arm
18*d* fourth arm
18*e* fifth arm

The invention claimed is:

1. A system for training minimally invasive surgery, comprising a housing, at least one minimally invasive surgery tool and a workspace, wherein the system further comprises at least one movable mechanism with at least two actuators, wherein the workspace is connected to the at least one movable mechanism which and the at least one movable mechanism is connected to the housing; and wherein the movable mechanism comprises an operation mechanism including two guides, each of the two guides comprising a screw connected to an axis of an electric motor, and each screw is connected to a respective carriage of the two guides, wherein a first carriage is connected to at least one guiding arm and a second carriage is connected to at least two guiding arms, wherein the workspace is mounted to the second carriage.

2. The system according to claim 1, wherein one or more of the at least two actuators is an electric motor.

3. The system according to claim 2, wherein the movable mechanism comprises a transmission coupled to the electric motor.

4. The system according to claim 1, wherein the movable mechanism comprises at least one encoder.

5. The system according to claim 1, wherein the system comprises a control arrangement and the control arrangement comprises a controller configured to control an electric motor.

6. The system according to claim 1, wherein the system comprises at least two terminal switches.

7. A system for training minimally invasive surgery, comprising:

a housing;
at least one minimally invasive surgery tool; and
a workspace;

wherein the system further comprises at least one movable mechanism having at least two actuators, the movable mechanism being connected to the housing and the workspace being mounted to the movable mechanism;

wherein the movable mechanism comprises an operation mechanism that is a guide, the guide comprising:

a first linear guide to which a first is movably connected;
a second linear guide movably mounted to the first carriage, the first linear guide being oriented at an angle of 90 degrees relative to the second linear guide;
wherein the first carriage comprises a first pulley, a second pulley, a third pulley and a fourth pulley;
a second carriage mounted to the second linear guide;
a belt fastening member provided at a first end of the second linear guide;
a fifth pulley and a sixth pulley arranged at a second end of the second linear guide;
a first drive pulley provided on an extension of the first linear guide at the first end thereof, the first drive pulley being connected to the axis of the electric motor;
wherein a belt is mounted to the belt fastening member and extends sequentially between the first pulley, the first drive pulley, the third pulley, the fifth pulley, the sixth pulley, the fourth pulley, the second drive pulley, the second pulley and back to the belt fastening member; and
wherein the second carriage is the workspace.

8. The system according to claim 7, wherein the movable mechanism comprises a carriage connected to at least one guiding arm between the carriage and the workspace, wherein the carriage is movably connected to one of the guides.

9. The system according to claim 8, wherein each guiding arm is connected between the carriage and the workspace, and each guiding arm is connected to the axis of the electric motor.

10. The system according to claim 9, wherein the electric motor is operatively connected to the carriage via an axis of rotation, and at least one guiding arm is connected at a first end to the carriage and at a second end to the workspace.

11. The system according to claim 8, wherein at least one guiding arm is connected between the carriage and the workspace and the guiding are is connected to the axis of the electric motor.

12. The system according to claim 11, wherein each guiding arm is connected between the carriage and the workspace, and wherein at least one guiding arm is coupled to the axis of the electric motor.

13. A system for training minimally invasive surgery, comprising:

a housing;

at least one minimally invasive surgery tool; and a workspace; wherein the system comprises at least one movable mechanism having at least two actuators, the movable mechanism being connected to the housing and the workspace being mounted to the movable mechanism;

wherein the movable mechanism comprises a carriage that is movably mounted to at least one guide and at least one guiding arm is connected between the carriage and the workspace;

wherein the at least one guiding arm is connected to an axis of an electric motor.

14. The system according to claim 13, wherein the at least one guide is a linear guide.

* * * * *